(12) United States Patent
Sawyer, Jr. et al.

(10) Patent No.: US 7,978,129 B2
(45) Date of Patent: Jul. 12, 2011

(54) SYSTEM AND METHOD FOR COLLECTING AND UPDATING GEOGRAPHICAL DATA

(75) Inventors: Tom Y. Sawyer, Jr., Palisade, CO (US);
Mark Beckner, Grand Junction, CO (US); Page Tucker, Charlotte, NC (US);
Scott Austin Jones, Glade Park, CO (US)

(73) Assignee: Global Precision Solutions, LLP., Grand Junction, CO (US)

( * ) Notice: Subject to any disclaimer, the term of this patent is extended or adjusted under 35 U.S.C. 154(b) by 1077 days.

(21) Appl. No.: 11/686,252

(22) Filed: Mar. 14, 2007

(65) Prior Publication Data

US 2007/0219722 A1  Sep. 20, 2007

Related U.S. Application Data

(60) Provisional application No. 60/781,719, filed on Mar. 14, 2006, provisional application No. 60/868,502, filed on Dec. 4, 2006.

(51) Int. Cl.
*G01S 19/11* (2010.01)
(52) U.S. Cl. .................................. 342/357.48
(58) Field of Classification Search .............. 342/357.48
See application file for complete search history.

(56) References Cited

U.S. PATENT DOCUMENTS

| | | | |
|---|---|---|---|
| 6,604,126 B2 | 8/2003 | Neiman et al. | |
| 6,850,161 B1 * | 2/2005 | Elliott et al. | 340/572.1 |
| 2004/0008120 A1 * | 1/2004 | Duncan et al. | 340/685 |
| 2004/0236620 A1 * | 11/2004 | Chauhan et al. | 705/9 |
| 2005/0268245 A1 | 12/2005 | Gipps et al. | |
| 2006/0288014 A1 * | 12/2006 | Edwards et al. | 707/100 |
| 2007/0206521 A1 * | 9/2007 | Osaje | 370/315 |
| 2008/0097731 A1 * | 4/2008 | Lanes et al. | 703/2 |

OTHER PUBLICATIONS

International Search Report and Written Opinion for corresponding PCT Application No. PCT/US07/64004, mailed on May 7, 2008, 6pp.

* cited by examiner

*Primary Examiner* — Thomas H Tarcza
*Assistant Examiner* — Harry Liu
(74) *Attorney, Agent, or Firm* — Christie, Parker & Hale, LLP.

(57) ABSTRACT

A system and method for generating a GIS data transaction including information about a topography of a region and utilities within the region. The method and system include providing information about the topography of the region; receiving information about a user collecting data related to one or more utilities in the region; receiving information about time and date of the collected data; receiving information about each of the utilities; receiving information about location of each of the utilities; and receiving information about the manner of collecting data. The system and method further include receiving information about revisions made to the information about the map; and integrating the received information with the information about the topography of the region into a GIS data transaction.

20 Claims, 7 Drawing Sheets

SYSTEM AND METHOD FOR COLLECTING AND UPDATING GEOGRAPHICAL DATA

CROSS-REFERENCE TO RELATED APPLICATION

This Patent Application claims the benefit of the filing date of U.S. Provisional Patent Application Ser. Nos. 60/781,719, filed on Mar. 14, 2006 and entitled "DATA COLLECTION TRANSACTION RECORD," and 60/868,502, filed on Dec. 4, 2006 and entitled "SYSTEM AND METHOD FOR INTEGRATION AND DISTRIBUTION OF GEOGRAPHICAL INFORMATION," the entire contents of which is hereby expressly incorporated by reference.

FIELD OF THE INVENTION

The present invention relates generally to collection of data representative of the location of utilities and infrastructure in the field for creating a grid and more particularly for establishing a record of each transaction during data collection.

BACKGROUND OF THE INVENTION

Data collection devices typically include a global positioning system (GPS) unit, a pole carrying a GPS antenna coupled to the GPS unit, a computer (an input device, display, memory and operating software) and power supplies for the GPS unit and the computer.

There are also systems presently in use for collecting the location points of the infrastructure, including, for example, roads, curbs, property lines, fences, man-made and natural elements of an area, and of assets including, for example, utility lines, archeological sites and habitats of endangered species. These systems record and/or display the final result of the data as collected by the operator. However, there is no record made of who collected data, when the data was collected or modified, and how (including what actions) the operator arrived at the final result.

Therefore, there is a need for a system and method for establishing an improved and complete record of each transaction of geographical data collection for utilities.

SUMMARY

In one embodiment, the present invention is a system and method for collection and recording data representative of the location of utilities and infrastructure in the field for creating a grid.

In one embodiment, the present invention is a method and system for generating a GIS data transaction including information about a topography of a region and utilities within the region. The method and system include providing information about the topography of the region; receiving information about a user collecting data related to one or more utilities in the region; receiving information about time and date of the collected data; receiving information about each of the utilities; receiving information about location of each of the utilities; receiving information about the manner of collecting data; receiving information about revisions made to the information about the map; and integrating the received information with the information about the topography of the region into a GIS data transaction.

The GIS data transaction may be used to generate a precision integrated grid and the precision integrated grid may be used to identify and locate a utility in the region. The GIS data transaction may then be displayed with reference to imagery of the area in real time.

In one embodiment, the present invention is a method and system for generating a precision integrated grid in a utility damage prevention system. The method and system include storing information about a map of a geographical region, a user collecting data related to one or more utilities in the geographical region, meta data related to each of the utilities, location of each of the utilities, and revisions made to the information about meta data and location of each of the utilities; generating a precision integrated grid from the stored information; and utilizing the precision integrated grid to identify and locate a utility in the region.

In one embodiment, the present invention is a GIS data transaction record that includes information about a topography of a region and utilities within the region. The GIS data transaction record further includes a first record for storing information about the topography of the region; a second record for storing information about a user collecting data related to one or more utilities in the region; a third record for storing information about time and date of the collected data; a fourth record for storing information about each of the utilities; a fifth record for storing information about location of each of the utilities; a sixth record for storing information about the manner of collecting data; and a seventh record for storing information about revisions made to the information about the topography.

DETAILED DESCRIPTION

In one embodiment, the present invention is a system and method for collecting and recording data representative of the location, and characteristics of utilities and infrastructure in the field for creating a grid.

A record of the transactions by an operator in the field during data collection may be useful to a project manager to observe the progress of a project or to observe the conduct of the operator. Further, such information may be useful if there is an accident in the area that is covered by the map. One type of accident that has occurred in the past is the accidental contact or fracturing of a utility line such as a gas line or a communication, fiber optic line. It will be useful to know if the utility line was properly located on the topography or map in use or whether it had one time been deleted from the map or moved on the map and who was responsible for the revisions. Thus, to provide a data transaction record for use during the collection of the data or as a historical record, a transaction table is provided in the field data collection equipment and in the central office data storage unit or server. If at any time it is necessary to determine the status of a map, as it existed at a particular time, and/or the nature of the changes made, and/or by whom and when the changes were made, the information is available in the transaction table at the server, which can also be communicated to a field operator using a hand-held or portable computer.

A geographical information system (GIS) format is selected on the basis of the subsequent use of the data by a damage control unit. In addition to the information concerning the asset or utility, it is often times desirable to have the infrastructure, such as road, fences, waterways, and so forth, that are in the area mapped on a display that is being used for displaying the location of the assets. A location of the infrastructure in the GIS data should be as precise as the location of the utilities from the asset location data.

Figure 1:
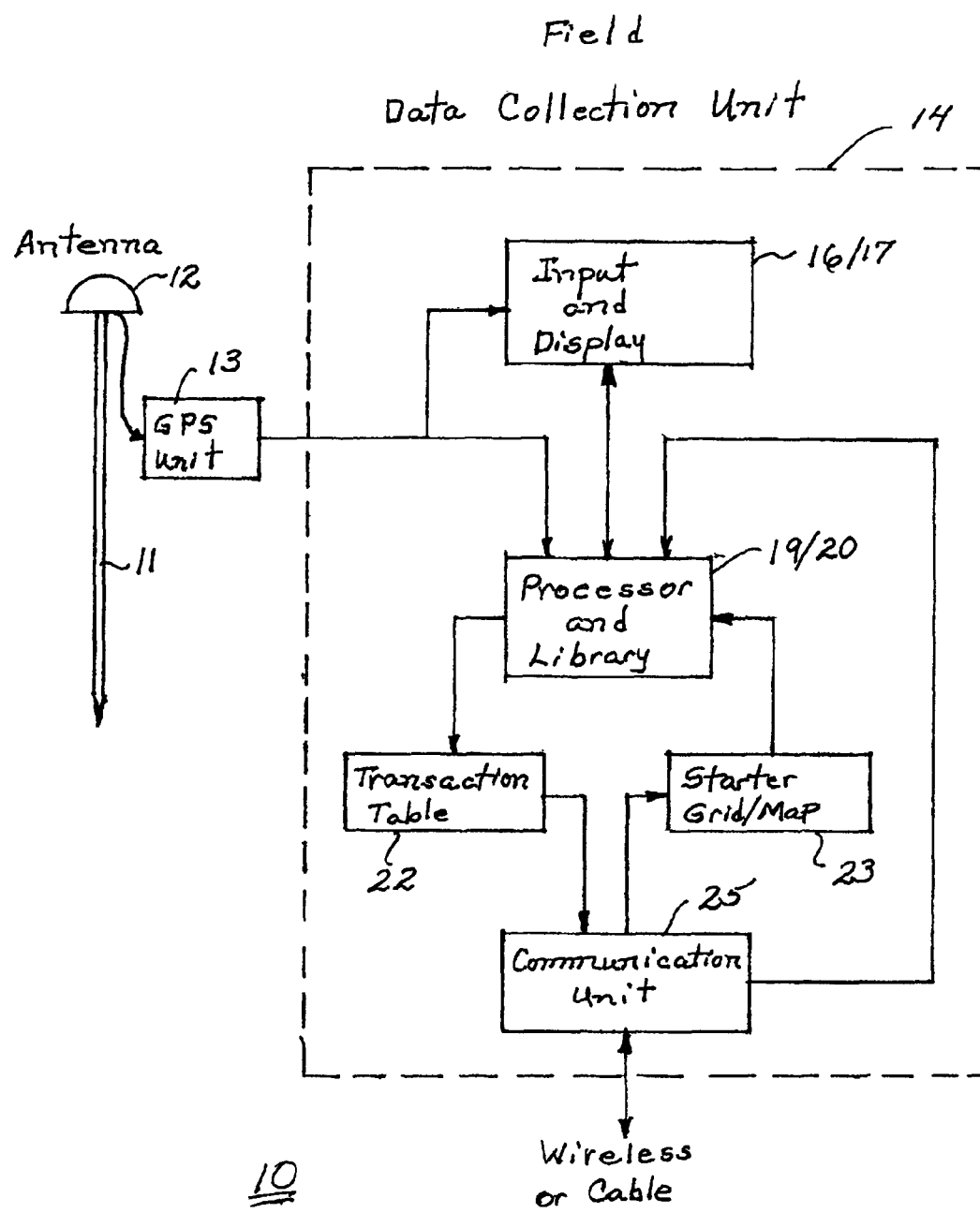
FIG. 1 is an exemplary block diagram of a data collection unit used in the field, in accordance with one embodiment of the present invention.

In one embodiment, the present invention includes a data collection unit. An exemplary block diagram of a data collection unit 10 that may be used in the field is shown in FIG. 1. The data collection unit 10 includes a locating pole 11, which is placed on top of or next to the item that is to be identified and its location placed in the grid or map. The item is typically a utility line or a component of the line or some part of the infrastructure in the area where the data is being collected.

The collection unit may further include an antenna 12 on top of the pole that is coupled to a location determining system (LDS) 13, such as a GPS unit. The antenna 12 and LDS unit 13 provide the longitudinal and latitudinal coordinates of the element under or next to the end of the pole 11. The coordinate position of the element at the output of the LDS unit 13 is coupled to a computer 14. The coordinate location is input to a processor 19 in the computer 14. The coordinate location is also applied to a display 17 and is visible to the user of the data collection unit.

In one embodiment, the computer 14 includes an input unit 16 and a display 17 which are shown combined in FIG. 1. The input unit 16 is typically separate from the display 17. The computer 14 also includes a processor 19 and a memory 20 that may include a library (shown combined in FIG. 1). Typically the library memory is included inside the computer 14. The processor 19 also include memory for the operating system of the computer and the software that is being used by the computer. The computer 14 further includes a transaction table 22, a starter grid map unit 23 that may be stored in the memory and a communication unit 25 for communicating, for example, wirelessly with a server. The computer 14 may be a Personal Computer (PC), a lap top computer, a personal digital assistant (PDA), a mobile phone, or the like.

Figure 2:
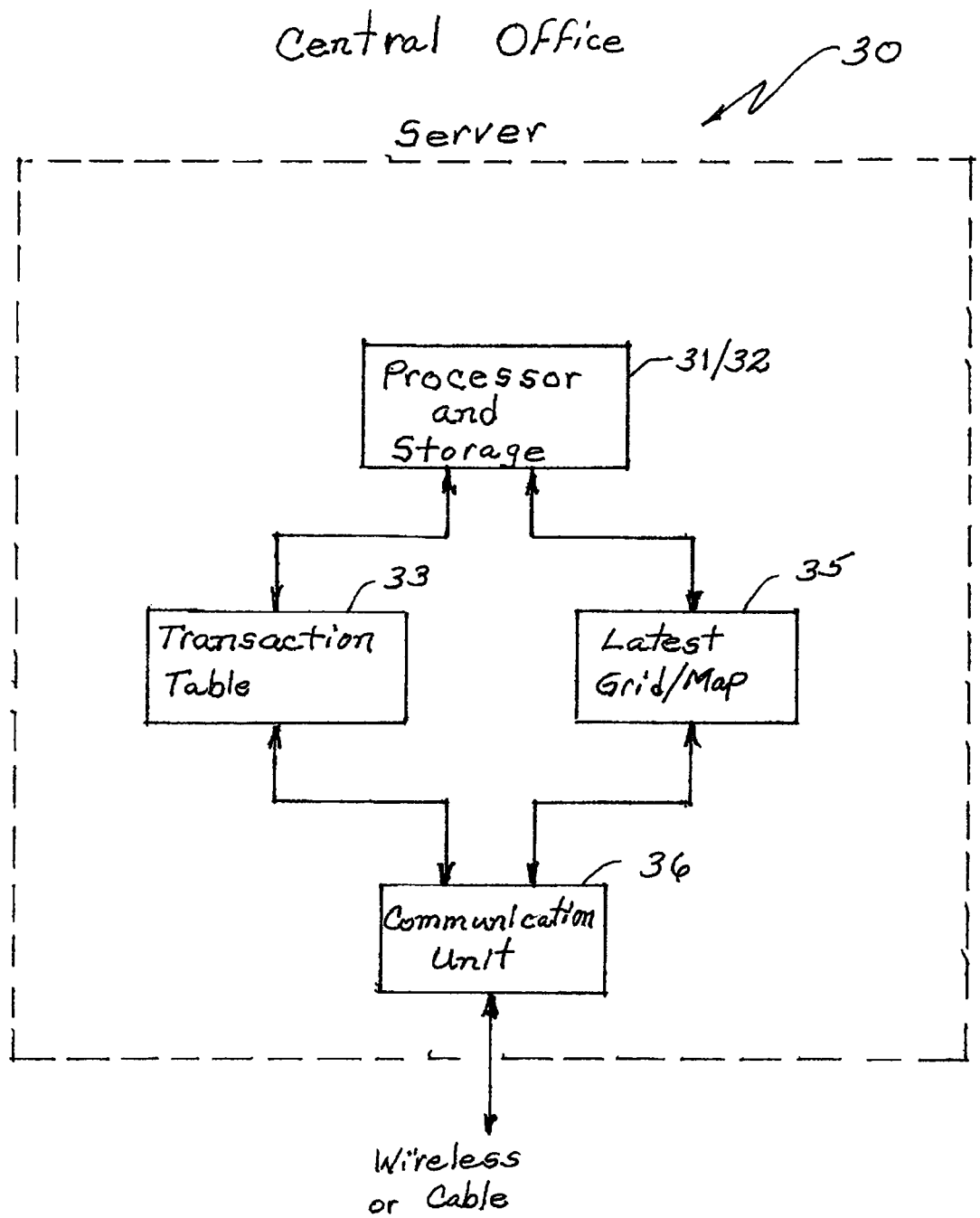
FIG. 2 is an exemplary block diagram of a server, in accordance with one embodiment of the present invention.

The information or data in the field gathered by the data collection unit 10 is sent to a server either by wireless or wired connection. An example of such a server is shown in FIG. 2. The information in the data collection unit may be lost or misplaced while the information stored in the server is to provide a permanent record of the information gathered by a data collection unit.

The server, as shown in FIG. 2, includes a processor 31 and memory or storage device 32. The server also includes a transaction table 33, a latest grid map unit 35 and a communication unit 36 for communicating with the communication unit of a data collection unit similar to the data collection unit 10 in FIG. 1.

The data or information collected in the field is transferred to the server for updating the asset location and infrastructure location for the specific area where the data collection unit is employed. The operator of a data collection unit in the field may change the location, description or existence of any utility line or component of a utility line or any element of the infrastructure or add data concerning the same during operation in the field. These changes or additions result in a new grid map for the area of concern. To provide a history of the changes and additions, a transaction table 22 is provided in the data collection unit and a transaction table 33 is provided in the server unit 30.

In one embodiment, a database may be used for damage prevention, data collection and asset management operations. For example, asset management operations may include using a facility file or similar information to identify, characterize or track an asset. In addition, various information products may be defined as discussed herein.

A system and method for collecting, storing and using data in the form of a grid map is disclosed in PCT Application PCT/US2005/025724 and in U.S. patent application Ser. No. 11/185,579 filed Jul. 19, 2005, the entire contents of which are incorporated herein by this reference as though set forth in full.

In one embodiment, asset (e.g., utility) location data may be created by the apparatus and method of the present invention as a utility line being placed in the earth. A record of this location is based on latitudinal and longitudinal coordinates that are stored for later use. A LDS provides the latitudinal and longitudinal coordinates for an asset position recorder while the utility line is being placed in the ground.

Another approach for creating a permanent record of the precise location of assets, such as underground utility lines, is placing RFIDs or transponders on the utility line as it is being placed in the ground. Thereafter, when the location of the utility line is to be recorded, an RFID Reader is moved along the ground to locate the RFIDs that are on the utility line. Other types of information, such as the type of the asset (utility), the size, manufacturer, the date of placement, date of future service, location based on one or more coordinates, owner of the utility, etc may be recorded with the RFID and subsequently read and used by the RFID Reader.

As the RFIDs are read, the position of the RFIDS, and therefore the utility line, is recorded by the use of an asset position recorder and optionally, also by a LDS that is coupled to the recorder. In one embodiment, the output of the asset position recorder is an ASCII stream having fields for the latitudinal coordinates, longitudinal coordinates and the identification of the underground asset, and the like.

In some embodiments, the invention is capable of recalling and revising the collected data using Precision Integration (PI). In some embodiments, PI is a methodology, process and technology used to assure that data points at each step of the information product development are captured and integrated into the information product in a manner that produces accurate and complete location data.

In some embodiments PI involves the use of an X, Y coordinate, and sometimes also a Z coordinate (e.g., altitude or depth). A accuracy of the signal having the X, Y (and Z) coordinates may be provided in collecting utility location data and in creating a GIS database, called a PI Landbase, that are combined in various steps of the system to provide a PI Grid. In some embodiments PI also involves the use of the location signal in creating a movable map that is displayed to show the accurate position of the data collection or data usage device and the user in relation to the PI Landbase. Some embodiments also provide for the accurate recall of the information based on the generation of data using LDS technologies, such as GPS that provide absolute, as opposed to relative, position data. Utility location information may be recalled anywhere, anytime in the world with the above mentioned system and method.

Figure 3:
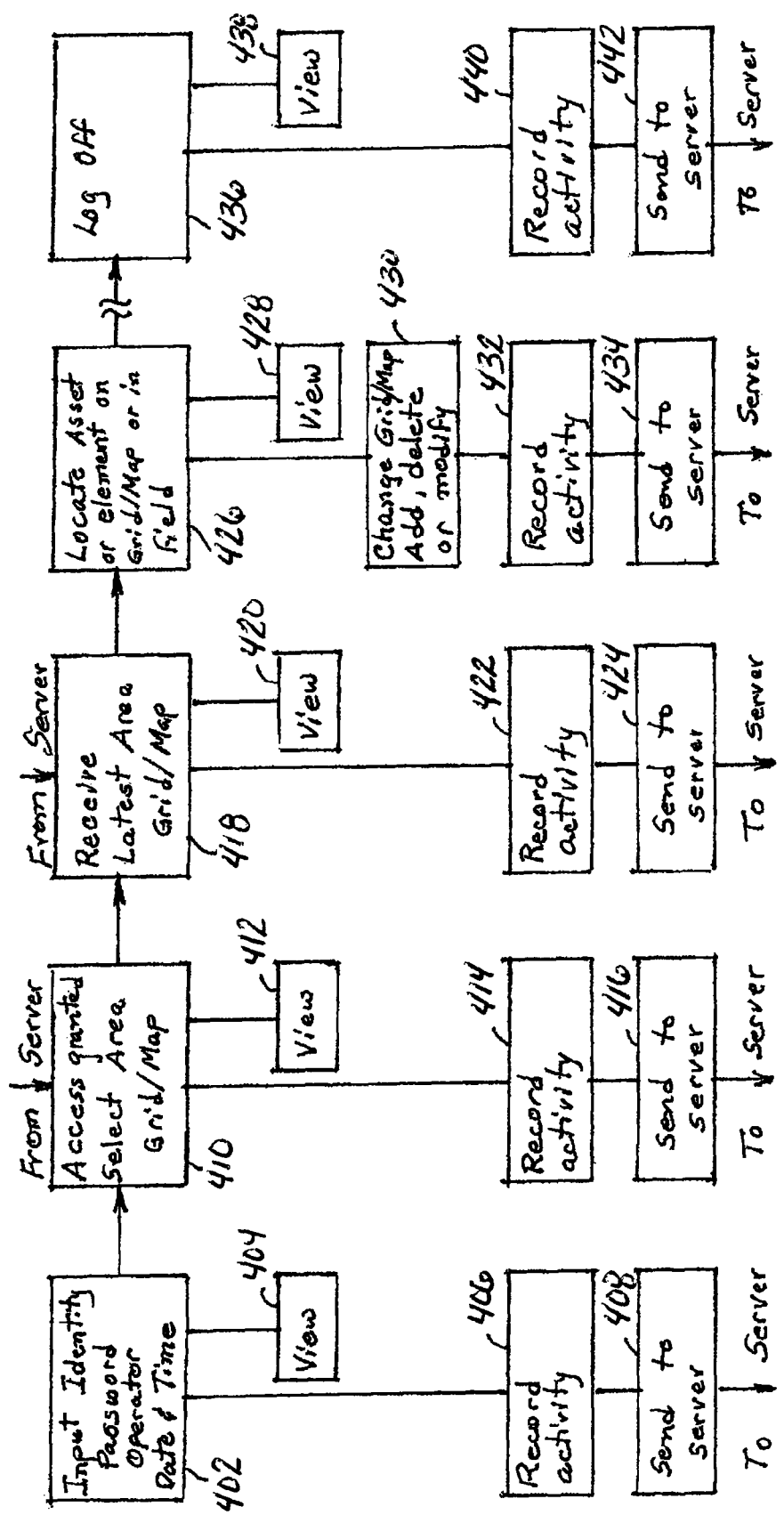
FIG. 3 is an exemplary flow chart of the steps employed by an operator using a data collection unit in the field, in accordance with one embodiment of the present invention.
Figure 4:
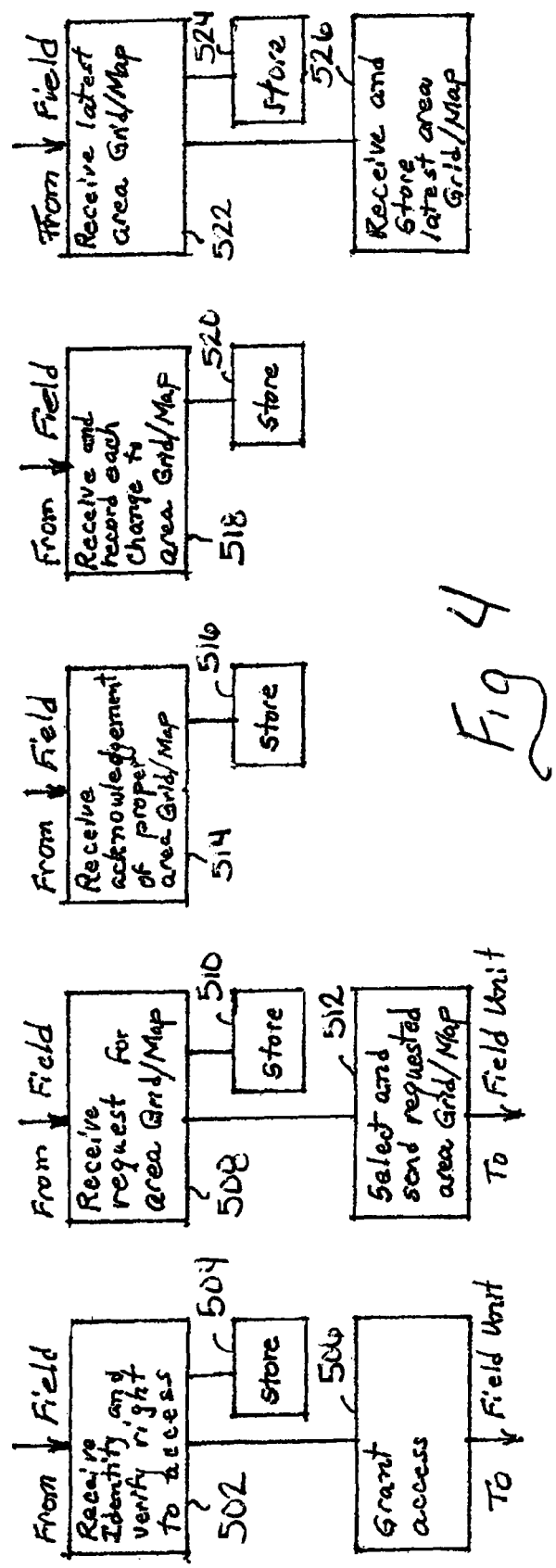
FIG. 4 is an exemplary flow chart of a process performed by a server during the collection of data in the filed, in accordance with one embodiment of the present invention.

Referring now to FIGS. 3 and 4, an exemplary operation of a data collection unit communicating with a server is shown in the exemplary flow charts. An operator authorized to use the grid map from a server for a selected area first logs onto the server 30 as shown in FIG. 3. The operator inputs an identity, which may include a password and name of the operator, and the date and time, as shown in block 402. This information is recorded in a transaction table (block 406) and is then sent to the server, as shown in block 408. As shown in FIG. 4, the server receives the information and verifies the right to access, in block 502. If the operator is entitled to access the server then the granting of the access is sent to the field unit, in block 506. As shown in FIG. 3, the access being granted is received from the server at the field unit and the operator then selects the area grid map that is to be used in the field, in block 410. At any time, the area grid map and the actions of the operator in the field may be viewed on a display as shown in blocks 404, 412, 418, 428, and 438. The selection of the grid map for the area is recorded in the transaction table in block 414. The selected area grid map information is then sent to the server in block 416.

The information from the field is received in the server, as shown in block 508 of FIG. 4, and the request for the area grid map is stored in the transaction table at the server, in block 510. The server then selects and sends the requested area grid map to the field unit in block 512. As shown in block 418 of FIG. 3, the selected area grid map in its latest version is received at the field unit from the server. This area grid map is displayed for viewing on the display in block 420. The receipt of the latest area grid map is recorded in the transaction table in block 422 and acknowledgement of the receipt is sent to the server from the field unit, in block 424. This acknowledgement is received at the server as shown in block 514 of FIG. 4 and stored in the transaction table in block 516.

The operator in the field is now ready to work with the area grid map (or topography data). The operator can now locate an asset, element, or utility in the grid map, as shown in block 426 and view the information (block 428). In block 430, the operator may perform actions such as adding, deleting or modifying assets, their locations, types, infrastructure and their location on the grid map. These actions or activities are then recorded in the transaction table in block 432. Each change to the grid map is recorded in the transaction table by specifying who, when, what, where, how, and the type of actions performed on the grid map. This information is then sent to the server as shown in block 434. Each action by the operator or activity of the operator is received at the server (block 518) and recorded in the transaction table at the server, as shown in block 520.

Finally, when the operator logs off (block 436), records and sends the latest area grid map to the server (blocks 440 and 442), the latest area grid map is received from the field by the server (block 522) and is stored in the transaction table (block 524) and storage (block 526), at the server.

Figure 5:
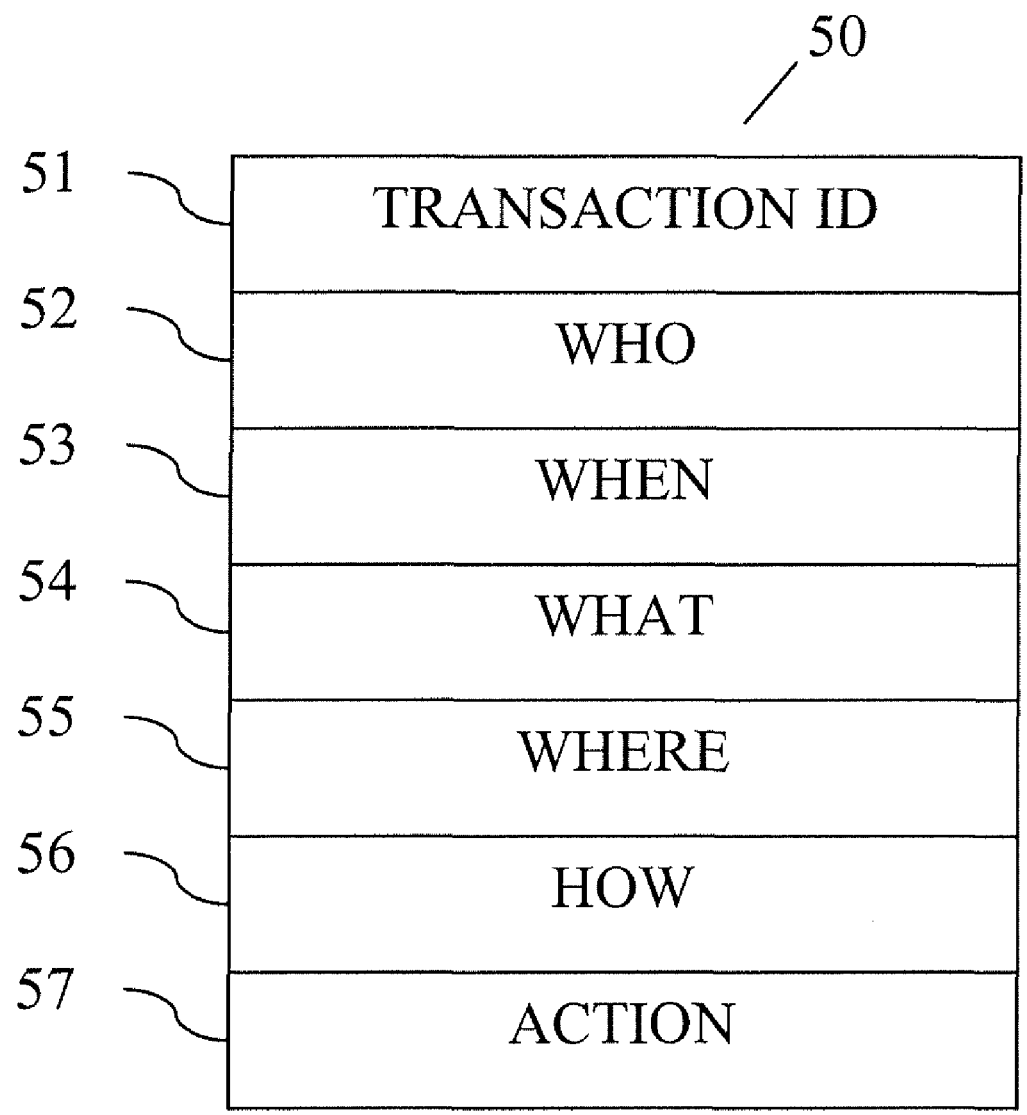
FIG. 5 shows an exemplary GIS data transaction record, in accordance with one embodiment of the present invention.

FIG. 5 shows an exemplary GIS data transaction record, according to one embodiment of the invention. As shown, the GIS data transaction record 50 includes a Transaction ID field 51 (record), a WHO field (record) 52, a WHEN field (record) 53, a WHAT field (record) 54, a WHERE field (record) 55, a HOW field (record) 56, and an ACTION field (record) 57. The Transaction ID field 51 include the identification of the transaction. The WHO field 52 may include user information, information about the data collection device, and the LDS, for example the ID of the device and the ID of a GPS unit. The WHEN field 53 may include different times associated with the transaction and the collected data, for example, server time, client (device) time, satellite time, and the like. The WHAT field 54 may include areas such as a particular subdivision in a particular county, points such as rocks, valves, topographical points of the areas, and any thing else that can be represented by a point. The WHAT field 54 may also include lines, such as cables, pipelines, gas lines, sewage lines, and the like. Additionally, the WHAT field 54 may include meta data related to the points and lines, such as color, manufacturer, size, age, serial numbers, etc. of the valves, cables, pipelines, and others.

The WHERE field 55 may include location data from different coordinates systems, such as satellite coordinate system, x, y, z datums, projection data, and the like. The HOW field 56 may include the type of the LDS, such as the type of the GPS device, laser range finder device, or RFIDs; the type of the data collection device, such as PC, lap top, PDA; and the like. The ACTION field 57 may include the actions that the operator(s) has taken, for example, add, modify, delete, copy, send, etc.

The GIS data transaction record can then be used to generate a precision integrated grid. The precision integrated grid is used to identify and locate a utility in the region. The information can then be used to warn, for example, a ground breaking project of the location of above or below ground utilities. Striking or breaking a utility can be of such consequence that tools and methods associated with this task must be of high reliability. Some embodiments generate enhanced utility location data sets that meet usage criteria that are set by project managers responsible for utility asset management and/or damage prevention on a project. In some embodiments a project manager may set forth and document accuracy, completeness, currency and utility type visibility criteria and requirements for the data sets to be used for the specific project, based on the related GIS data transactions. For example, a project may require a SUE engineering, a Standard for locating underground utilities. A GIS data transaction record may thus be created that meets the criteria set by the project manager. The completed GIS data transaction may be designated a PI Grid when it meets the project usage criteria set by the project manager.

In some instances, a PI Grid is used by project managers for utility asset management and utility damage prevention. Data integrity requirements differ from project to project. The PI Grid may be designed to support a higher level data integrity requirement, for example, damage prevention. By supporting the higher level of data integrity requirement, value added services may be provided for the remainder of utility asset management projects that have lesser standards for data integrity. In most damage prevention scenarios, there is a requirement for using ground breaking equipment in areas where conflict with utilities is probable.

Figure 6:
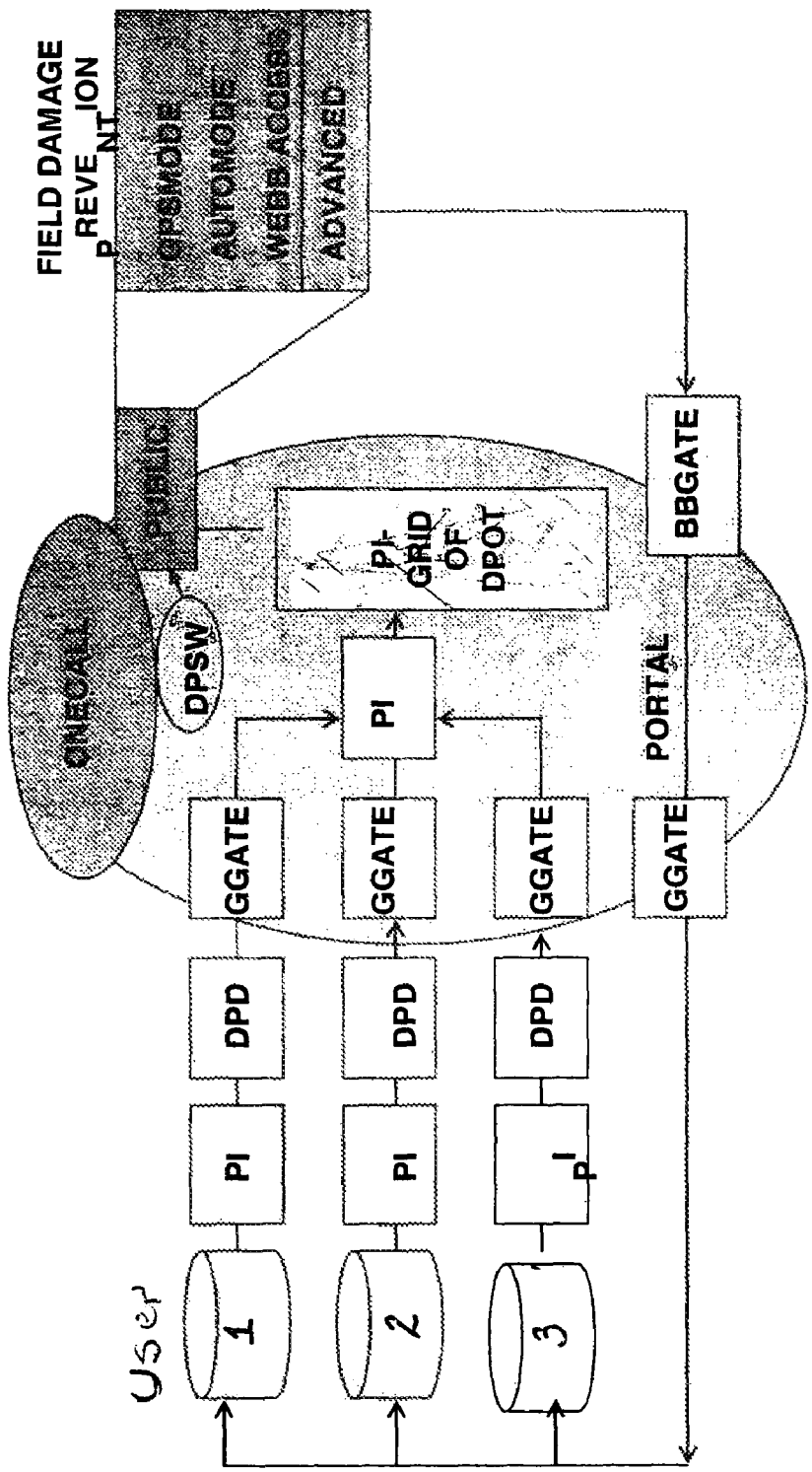
FIG. 6 depicts an exemplary Portal supporting damage prevention services utilizing GIS data transaction records, in accordance with one embodiment of the present invention.

FIG. 6 depicts an exemplary Portal supporting damage prevention services utilizing GIS data transaction records from different owners, according to one embodiment of the present invention. As shown, each user-company/organization (user), utilizes the system of the present invention to create a GIS data transaction record. A group of GIS data transaction records is called a Damage Prevention Dataset (DPD) hereinafter. In one embodiment, each of these sets of transaction records is combined to create a composite PI grid of a particular area that includes DPD from each contributing data source (user/owner). Each user implements an agreed to and coordinated PI process, as described above. As a member of a cooperative effort, each user's PI process is reviewed and coordinated with the other cooperative users. The PI process includes business rules and criteria and technology processes that result in the creation of and provisioning of a DPD. In one embodiment, the DPD is described by a technical data specification or description and is developed from a specific definition of GIS data in which the GIS layers, data, attributes, coordinate and positional and currency of data of the DPD is described. In one embodiment, the DPD is a subset of user data that is provided for public usage for the specific purpose of supporting damage prevention and avoidance within the prescribed Damage Prevention Operations Theatre (DPOT). The DPOT is the geographical area that is covered by or serviced by DPD data or the area in which Damage Prevention services are provided.

In one embodiment, the integrity, pedigree, correctness, currency and location accuracy of the DPD is the responsibility of the user and is described or pedigreed by the PI process. The user certifies the pedigree of the data meaning that the user describes the data in terms of source, accuracy and currency. A user may provide a highly accurate, up to date DPD, while another may provide one that is not as accurate or up to date. The pedigree of the DPD provided is clearly described and liability disclaimers concerning the use of the data are based on the defined criteria described in the PI process.

The ONECALL block represents the function performed by ONECALL™ centers that act as a central clearinghouse for marking of utilities in areas where digging will occur. A user can call ONECALL™ and tell them that the user will be digging, for example, at the corner of $7^{th}$ street and ELM Ave. ONECALL™ then sends a locate ticket to all utility companies that may have utilities in that area. The utility companies are then required to mark the location of the utilities. A ONECALL™ entity could serve as the sponsor or clearing house for a public damage prevention system by utilizing the system and method of the present invention.

Pedigree is attained utilizing the PI process to create a unique combination of data that provides for a Damage Prevention View (DPV) of utility locations in the field. DPD are utilized in the Damage Prevention system to provide a DPV of data in the field focused around the decision of 'dig or no dig' related to utilities. The pedigree of the data facilitates the DPV which is a display of data contextual to utility damage prevention is presented to the user (for example, in a digging equipment) in real time to support operational decision making. In operation, a field operator can see on his portable display how recent and how accurate the data is and where (the source) the data has come from. Based on this conveniently displayed data, the field operator can make a dig or no dig' decision related to utilities in the area. The user interface is also designed in such a way to visually make it easier for the field operator to make such dig or no dig' decisions. For example a danger area or a buffer zone may be displayed in red color and boundary lines, so that the operator could easily see that areas that she needs to avoid with respect to the location of the utilities and her location in the area.

One component of the PI process is a data interchange mechanism. In one embodiment, this data interchange mechanism is based on Extensible Markup Language (XML) that is tailored to the data requirements of the utility damage prevention function. The PI Process generates an XML specification, Damage Prevention XML (DPXML), to enable a user to easily share data with the Portal. The standard includes all tags and definitions needed to pedigree data and to otherwise identify DPD for exposure to the Portal for public use. The standard will increase the interoperability of user GIS systems with the Portal.

In one embodiment, user organizations expose (make available) DPD to the invention's Portal utilizing a Portal GIS Gateway (GGATE). The GGATE is a combination of telecommunications connectivity services combined with data mapping capability of the invention. In one embodiment, the Portal utilizes BizTalk™ functionality to implement the GGATE. The GGATE accepts DPD file updates from various user sources and stores it in a particular format called a Precision Integration Facilities File (PIFF). The timing and update schedule for DPD file updates to the Portal is a function of the agreed to PI process entered into by cooperative user contributors to the system. In effect, the user is broadcasting a subset of user GIS data into the public domain by exposing it to the Portal.

In one embodiment, the Portal implements a next step of the PI process, combining PIFF files via a proprietary process to create a PI Grid. The PI Grid is comprised of a combination of PIFF data from user sources rendered as a Precision Landbase.

In one embodiment, users register with a damage prevention service provider to gain access to damage prevention services that are available within the DPOT. If approved for access, the users are allowed to download Damage Prevention Software (DPSW) to their local computing devices. DPSW provides for real time damage prevention functionality in the field and for viewing of relevant PI Grids from the local computing device.

In one embodiment, DPSW is installed on computing devices including desktop computers, laptop computers, hand held devices, PDA, or mobile phones. If the computing device can be attached to a GPS that outputs coordinate data in a National Marine Electronic (NMEA) format, the DPSW software will interoperate with GPS coordinate outputs in "GPSMODE." If the device cannot be used with a GPS, the DPSW will operate in an "AUTOMODE." Internet connectivity is required for use of the damage prevention system in either case. Internet connection provides real time access to damage prevention services.

The DPSW operating in GPSMODE allows the user to travel to an area of interest within the DPOT. PI Grids that have DPD relevant to the current GPS position of the user are automatically designated by the system and may be accessed or downloaded by the system via the Internet connection of the computing device. DPSW operating in GPSMODE utilizes designated PI Grids and provides utility Damage Prevention DPFIND (for example, "Find" and or "Locate") functionality. DPFIND shows the user the direction and distance to utilities that are present on the PI-GRID and provides pedigree data for the utilities presented, providing for operational decisions in the field including avoiding utilities during dig, marking and designating utilities, contacting user, and planning and other operational tasks In one embodiment, users with designated security access may use DPSW in GPSMODE and develop field data updates and transmit these updates via the Portal for use as field validation updates to user GIS data. "Field Data Updates" may also be used to integrate with and provide field data updates to one call systems. "Advanced Services" may use a Business to Business Gateway (BBGATE) designed to for transfer and mapping of data between systems.

DPSW operating in AUTOMODE may access PI Grids of interest by selecting grid areas from a DPOT key map. PI Grids may be accessed and the data in the grids may be viewed with access to all services except "DPFIND" but including access to pedigree of information on the grid. Users with approved access may download DPSW software or access via Webb Access (no client software required) PI Grids of interest by selecting GRID areas from a DPOT key map. PI Grids may be accessed and the data in the grids may be viewed with access to all services except DPFIND but including access to pedigree of information on the grid.

Figure 7:
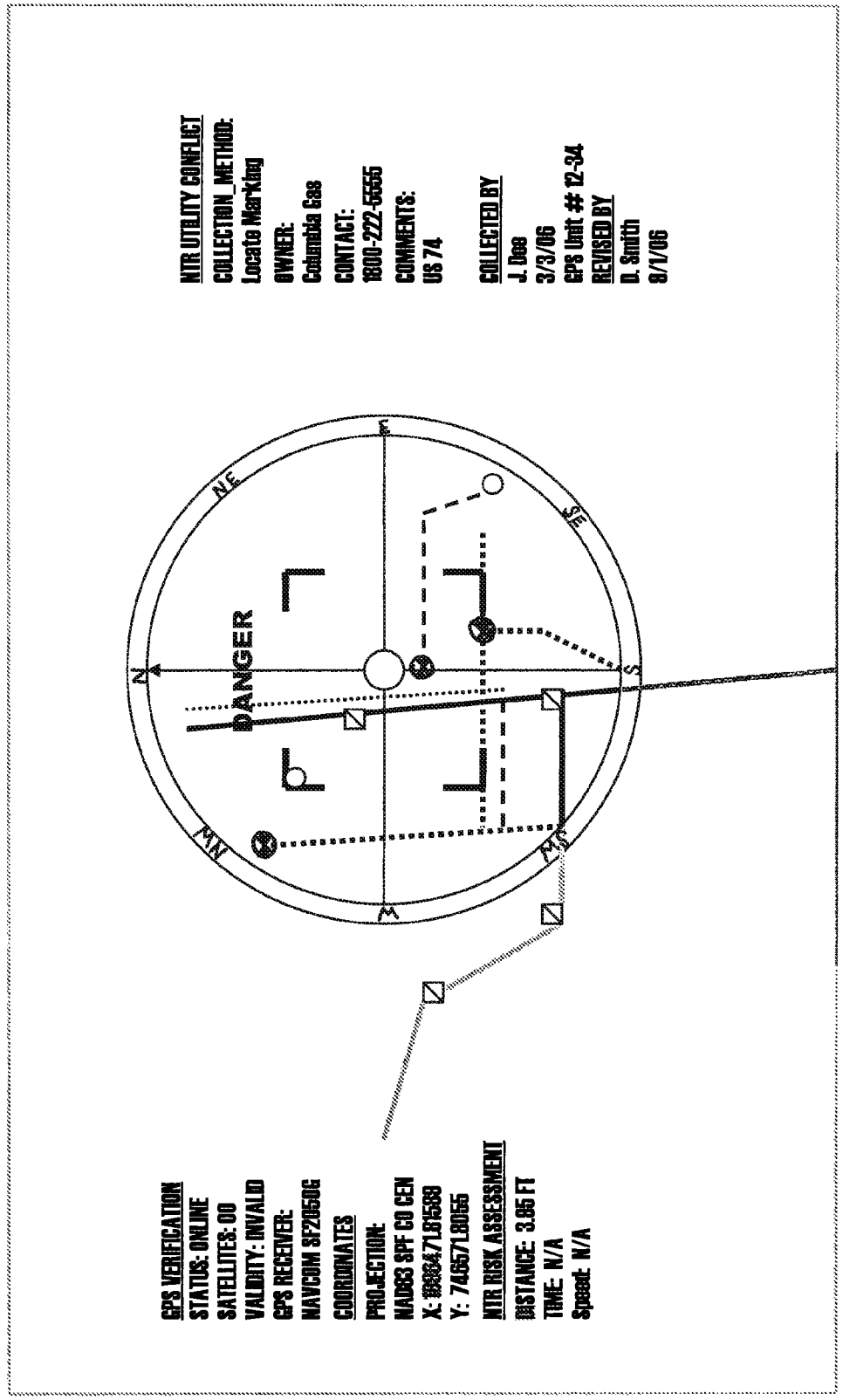
FIG. 7 is an exemplary display utilizing GIS data transaction records in a damage prevention system.
Figure 6:
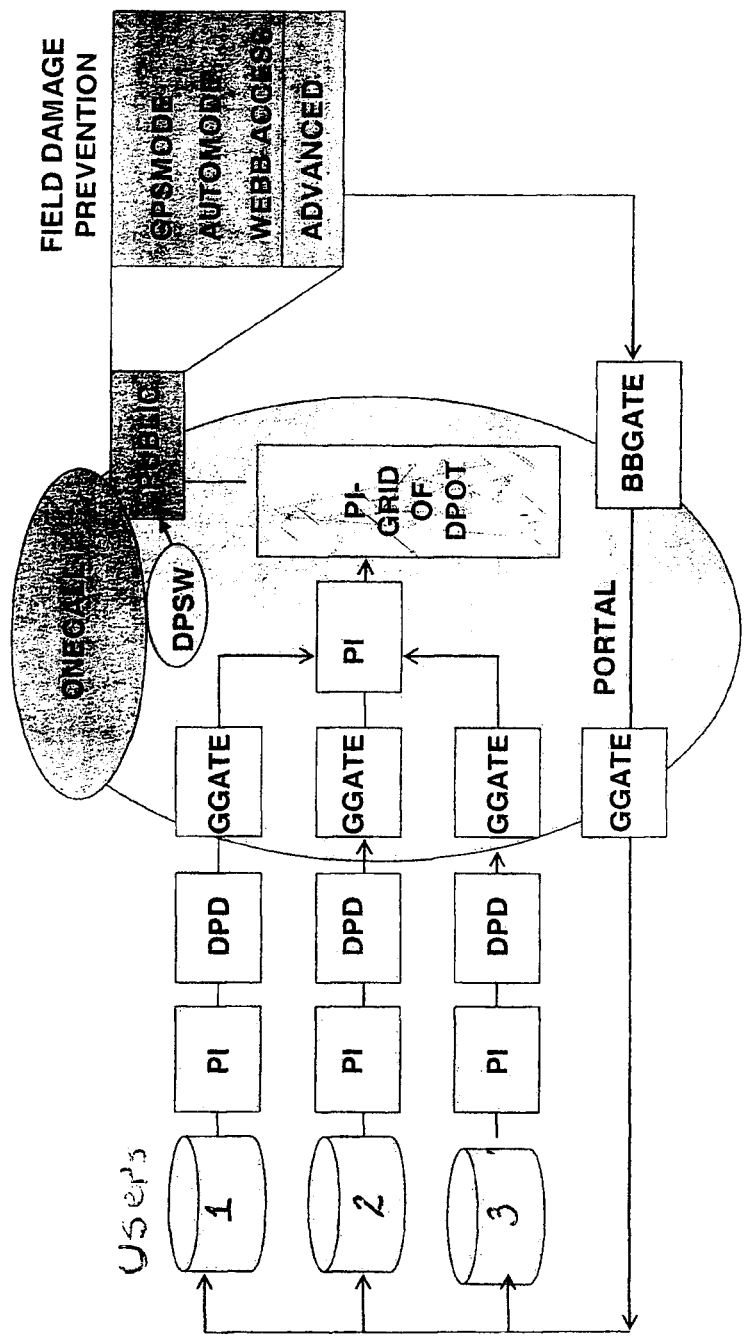

FIG. 7 is an exemplary display utilizing GIS data transaction records in a damage prevention system, according to one embodiment of the present invention. In one embodiment, the server may utilize RTI and provide to the client devices in the field real time visual location in the context of a project area topography (map) enhanced with photo imagery of the project area, as shown. During utility data gathering the data collector can see where he is on the map and verify the locations that he is taking against identifiable landmarks (e.g., as seen and as represented on the display), as shown in FIG. 7. During damage prevention usage real time visual location and utility "closeness" warning feedback may be provided to an individual or to equipment on which the module is placed. Utility information may be viewable in reference to imagery of the related or project area, in real time providing the current position of equipment or personnel relative to the location of utilities and may be viewable as the person or machine moves in any direction.

The PI Grid designation or Certification may indicate to the project manager that the PI Grid meets project criteria for the use of the data in damage prevention or other utility asset management applications. The PI Grid may be presented to the user, via a computer screen, or a display as a sophisticated, intuitive, project area topography (map) that provides utility location information superimposed on imagery of the project area (e.g., a visual representation of an overhead view and other indicia). The PI Grid may be presented as a movable map that directionally turns with the movement of the person or equipment to which the data collection device is attached or carried. For example, as the data collection device is moved (changes position) or turns (changes direction) the displayed image may change accordingly (e.g., keeping the data collection device in the middle of the project area and orientating the project area so that it "faces" the same direction as the person or equipment). As a user walks or rides around a project area, the PI Grid, presented in RTI, may move and indicate the location of the user (e.g., via a visual representation) within the project area, while simultaneously showing the location of utilities (e.g., via a visual representation) within user defined utility location buffer areas, as shown in FIG. 7. The capability of presenting PI Grid data in this useable, real time mode provides project managers with real time utility location data that is accurate and actionable per the operational requirements of the project manager.

Utilizing a GIS data transaction, a data collection device may show (in real time) data points that are collected and symbology and other meta-data attributes that may be associated with collected data. The data collection device may provide real time feedback, and validation, and by facilitating "eyes on the ground validation" may significantly increase data accuracy. Using a GIS data transaction, data collectors may validate "where they are" in a project area and validate that the data they are collecting or revising is the "correct data."

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for generating a GIS data transaction including information about a topography of a region and utilities within the region, the method comprising:
providing information about the topography of the region;
receiving information about a user collecting data related to one or more utilities in the region;
receiving information about time and date of the collected data;
receiving information about each of the utilities;
receiving information about location of each of the utilities;
receiving information about the manner of collecting data;
receiving information about revisions made to the information about the topography; and
integrating the received information with the information about the topography of the region into a GIS data transaction.

2. The method of claim 1, wherein receiving information about each of the utilities includes information about one or more of area, points, lines, and meta data.

3. The method of claim 1, wherein receiving information about each of the utilities comprises reading information from an RFID affixed to each of the utilities.

4. The method of claim 1, further comprising generation a precision integrated grid from the GIS data transaction.

5. The method of claim 4, further comprising utilizing the precision integrated grid to identify and locate a utility in the region.

6. The method of claim 5, further comprising displaying the GIS data transaction with reference to imagery of the area in real time.

7. The method of claim 6, further comprising providing current location of the user relative to the location of a utility and displaying the GIS data transaction with reference to the imagery of the area as the user moves in any direction.

8. The method of claim 4, further comprising creating a movable map from the precision integrated grid and displaying the movable map in real time for showing the location of the user in relation to a utility.

9. The method of claim 1, further comprising pedegreeing the GIS data transaction.

10. The method of claim 1, further comprising broadcasting the GIS data transaction into a portal.

11. The method of claim 1, further comprising generating a plurality of GIS data transactions for a respective plurality of owners and combining the plurality of GIS data transactions to generate a precision integrated grid.

12. A method for generating a precision integrated grid in a utility damage prevention system, the method comprising:
storing information about a map of a geographical region, a user collecting data related to one or more utilities in the geographical region, meta data related to each of the utilities, location of each of the utilities, and revisions made to the information about meta data and location of each of the utilities;
generating a precision integrated grid from the stored information; and
utilizing the precision integrated grid to identify and locate a utility in the region.

13. The method of claim 12, wherein meta data related to each of the utilities includes information about one or more of area, points, and lines.

14. The method of claim 12, further comprising displaying the precision integrated grid with reference to imagery of the area in real time.

15. The method of claim 12, further comprising creating a movable map from the precision integrated grid and displaying the movable map in real time for showing the location of the user in relation to a utility.

16. The method of claim 12, further comprising pedegreeing the stored information.

17. The method of claim 12, wherein generating a precision integrated grid from the stored information comprises generating a plurality of GIS data transactions for a respective plurality of owners and combining the plurality of GIS data transactions to generate the precision integrated grid.

18. A GIS data transaction record including information about a topography of a region and utilities within the region comprising:
   a first record for storing information about the topography of the region;
   a second record for storing information about a user collecting data related to one or more utilities in the region;
   a third record for storing information about time and date of the collected data;
   a fourth record for storing information about each of the utilities;
   a fifth record for storing information about location of each of the utilities;
   a sixth record for storing information about the manner of collecting data; and
   a seventh record for storing information about revisions made to the information about the topography.

19. A system for generating a precision integrated grid in a utility damage prevention system comprising:
   a database for storing information about a map of a geographical region, a user collecting data related to one or more utilities in the geographical region, meta data related to each of the utilities, location of each of the utilities, and revisions made to the information about meta data and location of each of the utilities;
   means for generating a precision integrated grid from the stored information; and
   means for utilizing the precision integrated grid to identify and locate a utility in the region.

20. The system of claim 19, further comprising a display screen for displaying the precision integrated grid with reference to imagery of the area in real time.

* * * * *

UNITED STATES PATENT AND TRADEMARK OFFICE
CERTIFICATE OF CORRECTION

| | | |
|---|---|---|
| PATENT NO. | : 7,978,129 B2 | |
| APPLICATION NO. | : 11/686252 | |
| DATED | : July 12, 2011 | |
| INVENTOR(S) | : Tom Y. Sawyer, Jr. et al. | |

It is certified that error appears in the above-identified patent and that said Letters Patent is hereby corrected as shown below:

In the Drawings

FIG. 6, Sheet 6 of 7    Delete Drawing Sheet 6 and substitute therefore the Drawing Sheet, consisting of FIG. 6, as shown on the attached page

In the Claims

Column 10, Claim 1, line 25    Delete "generation"
Insert -- generating --

Signed and Sealed this
Twenty-seventh Day of December, 2011

David J. Kappos
*Director of the United States Patent and Trademark Office*